(12) United States Patent  
Bauernfeind

(10) Patent No.: US 7,644,979 B2  
(45) Date of Patent: Jan. 12, 2010

(54) FRONT-END PART OF A MOTOR VEHICLE WITH AN AIR-GUIDING ELEMENT

(75) Inventor: Christoph Bauernfeind, Bietigheim-Bissingen (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 12/420,851

(22) Filed: Apr. 9, 2009

(65) Prior Publication Data

US 2009/0256397 A1    Oct. 15, 2009

(30) Foreign Application Priority Data

Apr. 9, 2008    (DE) .................. 10 2008 017 896

(51) Int. Cl.  
*B60J 7/00*    (2006.01)

(52) U.S. Cl. ........................ 296/193.09; 296/193.1

(58) Field of Classification Search ............ 296/187.09, 296/193.09, 193.1; 180/68.6; 293/115  
See application file for complete search history.

(56) References Cited

U.S. PATENT DOCUMENTS

| 6,880,882 B2 * | 4/2005 | Andre et al. ............ 296/193.09 |
| 7,014,254 B2 | 3/2006 | Rijsbergen et al. |
| 7,073,848 B2 * | 7/2006 | Lee ........................ 296/193.09 |

FOREIGN PATENT DOCUMENTS

| DE | 103 42 168 A1 | 5/2005 |
| DE | 102004027468 A1 | 12/2005 |
| DE | 102004063741 A1 | 10/2006 |
| EP | 0 175 655 A1 | 3/1986 |
| JP | 58105850 A | 6/1983 |

OTHER PUBLICATIONS

German Search Report dated Apr. 23, 2009.

* cited by examiner

*Primary Examiner*—Joseph D Pape

(57) ABSTRACT

A front-end part of a motor vehicle has an air scoop with an air-guiding duct to a charge air cooler between a central air inlet opening and a lateral air inlet opening of an air-guiding element. Wherein, in a pre-installation position, the air scoop is kept folded away on a central air-guiding element and, in an installation position, is folded back and can be connected to a lateral air-guiding element.

8 Claims, 3 Drawing Sheets

FRONT-END PART OF A MOTOR VEHICLE WITH AN AIR-GUIDING ELEMENT

CROSS-REFERENCE TO RELATED APPLICATION

This application claims the priority, under 35 U.S.C. § 119, of German application DE 10 2008 017 896.9, filed Apr. 9, 2008; the prior application is herewith incorporated by reference in its entirety.

BACKGROUND OF THE INVENTION

Field of the Invention

The invention relates to a front-end part of a motor vehicle with an air-guiding element which, in a central region and lateral regions, contains air inlet openings which are directed toward a radiator and toward a charge air cooler of an internal combustion engine.

Published, non-prosecuted German patent application DE 103 42 168 A1, corresponding to U.S. Pat. No. 7,014,254, discloses a vehicle with an air inlet opening arranged in a front-end part, wherein central and lateral air inlet openings are provided. Furthermore, published European patent application EP 0175 655 A1 discloses an air supply to a radiator of an internal combustion engine of a motor vehicle via a lateral air inlet opening in a front-end part.

SUMMARY OF THE INVENTION

It is accordingly an object of the invention to provide a front-end part of a motor vehicle with an air-guiding element which overcomes the above-mentioned disadvantages of the prior art devices of this general type, which air-guiding element first ensures a compact delivery state of the front-end part and second ensures good accessibility for installation on the vehicle.

With the foregoing and other objects in view there is provided, in accordance with the invention, a front-end part of a motor vehicle. The front end part contains a central air-guiding element having a central air inlet opening directed toward a radiator of an internal combustion engine, lateral air-guiding elements having lateral air inlet openings directed toward a charge air cooler of the internal combustion engine, and air scoops each having an air-guiding duct. One of the air scoops is disposed in each case between the central air inlet opening and one of the lateral air inlet openings. In a pre-installation position, the air scoops are kept folded away from the lateral air-guiding elements on the central air-guiding element and, in an installation position, the air scoops are folded back and can be connected to the lateral air-guiding elements.

The advantages primarily obtained by the invention consist in that accessibility to longitudinal members of the vehicle and installation of the central air-guiding element and assembly of the entire front-end part module are in each case simplified by a pivotable air scoop which is arranged between a central air-guiding element and a lateral air-guiding element. This is achieved according to the proposal by an air scoop with an air-guiding duct being arranged in each case between a central air inlet opening and a lateral air inlet opening of an air-guiding element. The air scoop, in a pre-installation position, is kept folded onto the central air-guiding element and, in an installation position, the air scoop is folded back and is connectable in each case to the lateral air-guiding element.

In the pre-installation position and in the installation position, the air scoop is kept attached to the free end of limbs of the central air-guiding element via connecting elements. In particular, the connecting elements contain "hooked pegs" which are injection molded onto the end sides of outer limbs of the air scoop and are arranged directed vertically outward and snap into corresponding openings in the limbs of the central air-guiding element. The air scoop can be pivoted via the hooked pegs as connecting elements inward in the direction of the longitudinal center plane of the vehicle in the pre-installation position and outward toward the outer side of the vehicle in the installation position. In the pre-installation position, the air scoop is folded inward and can be connected in a clamping manner to the central air-guiding element.

The air scoop is connected to the central air-guiding element via the connecting elements configured as hooked pegs by the latter hooking into the openings in the limbs of the central air-guiding element, and therefore a complicated fastening via screw devices and the like is unnecessary.

The hooked pegs advantageously give rise to the option that, in the pre-installation position, the air scoop is arranged virtually between the limbs of the central air-guiding element, and a compact unit is produced in the delivery state.

After installation work at the front-end part of the vehicle is finished, the air scoop can be pivoted via the hooked pegs to the lateral air-guiding element, wherein, according to one proposal, in the installation position, the air scoop is connected with a snap fit to limbs of the lateral air-guiding element via an upper and a lower connecting element. The one, upper connecting element on the upper limb of the air scoop contains a pocket-shaped receptacle with a bent tab which, in the installation position, engages in a holding manner over an edge of the limb of the lateral air-guiding element. The other, lower connecting element on the lower limb of the air scoop contains a "head peg" which, in the installation position, engages, to provide a snap fit, in a slot in the limb of the lateral air-guiding element. By the configuration and arrangement of the connecting elements on the air scoop, the latter can be connected in a simple manner with a snap fit to the lateral air-guiding elements, with removal likewise being possible in a simple manner.

By use of the connecting elements, a pre-installable and removable air scoop is therefore possible without additional fastening measures, and accessibility from the front to the longitudinal members of the vehicle and to the bolted connection of the front module is therefore possible in a simple manner.

Other features which are considered as characteristic for the invention are set forth in the appended claims.

Although the invention is illustrated and described herein as embodied in a front-end part of a motor vehicle with an air-guiding element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
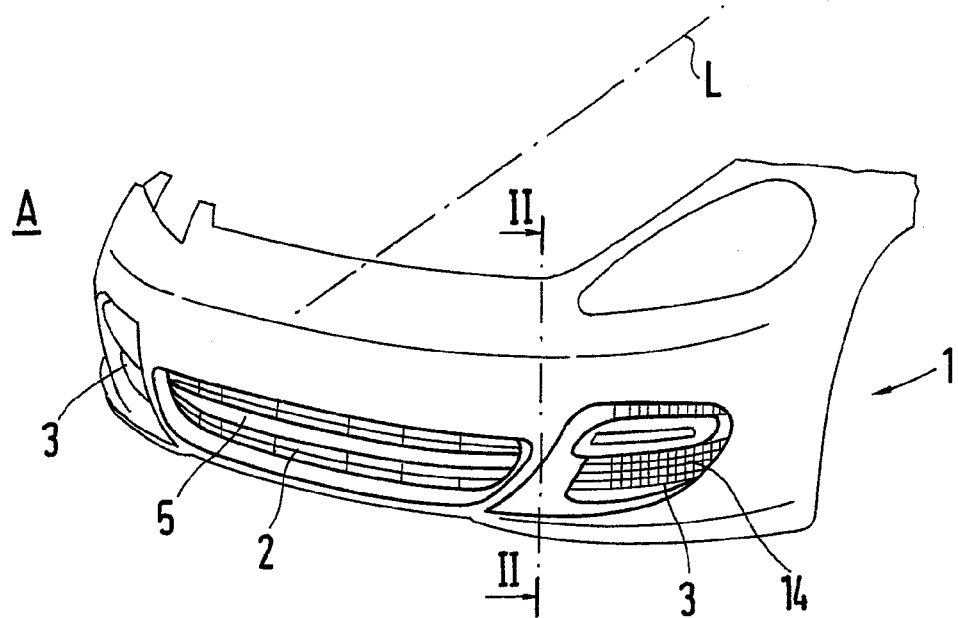
FIG. 1 is a diagrammatic, perspective front view of a front-end part with central and lateral air inlet openings according to the invention.
Figure 2:
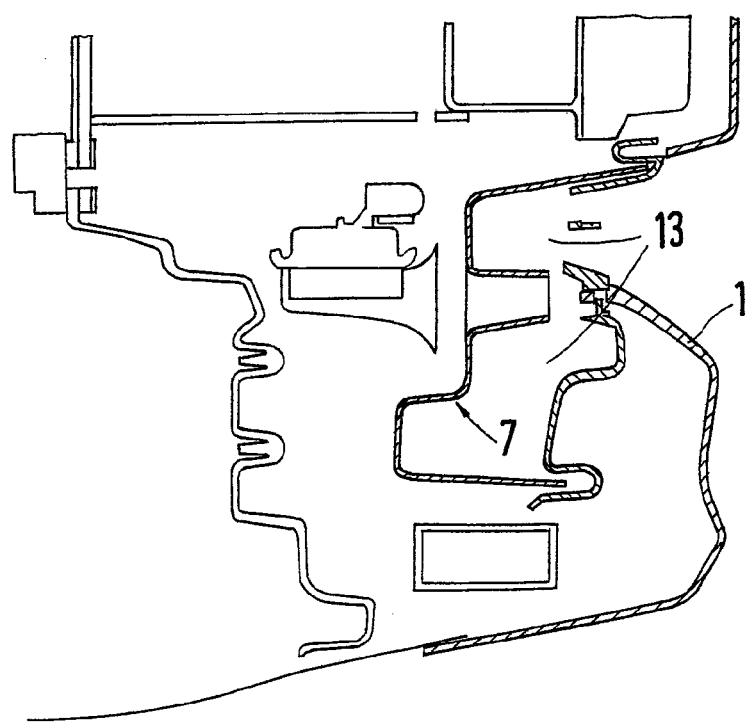
FIG. 2 is a sectional view taken along the line II-II of FIG. 1 through the front-end part with air-guiding elements.
Figure 3:
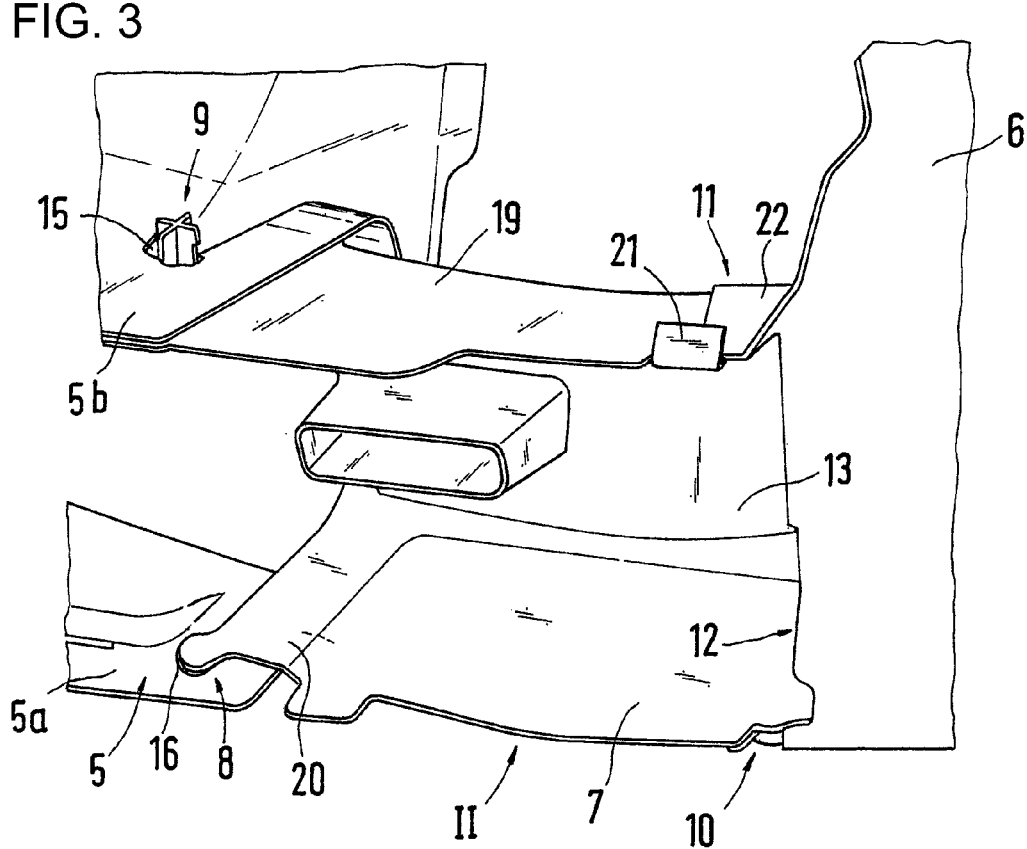
FIG. 3 is a diagrammatic, perspective view of an air scoop in an installation position.
Figure 4:
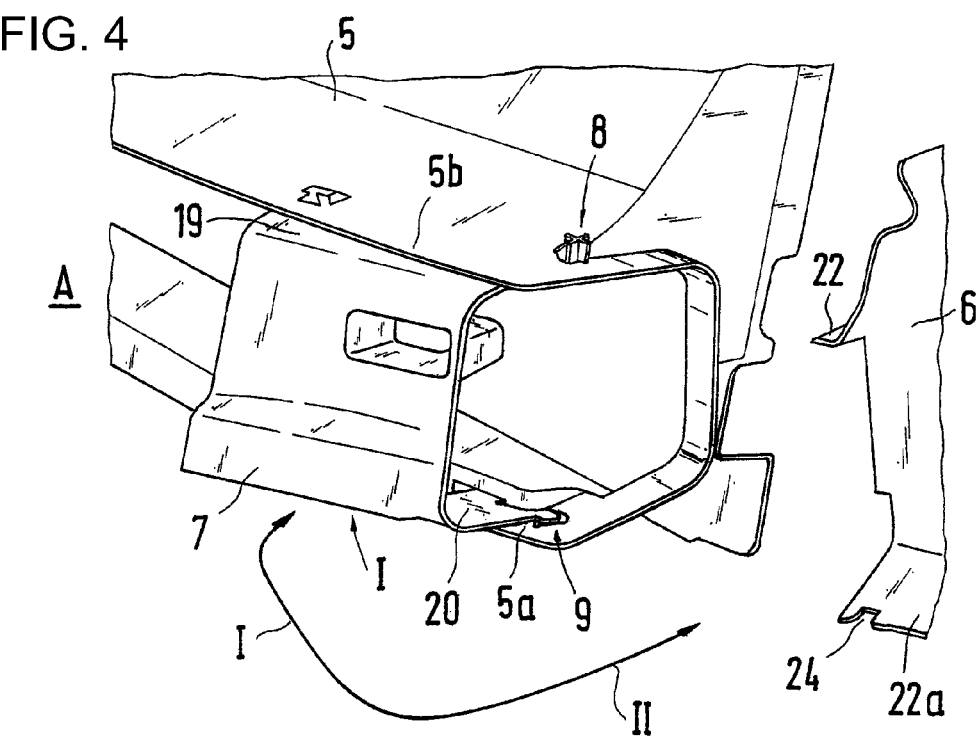
FIG. 4 is a diagrammatic, perspective view of the air scoop in a pre-installation position.

A front-end part 1 of a motor vehicle is provided with a central air inlet opening 2 and respective lateral air inlet openings 3. A central air-guiding element 5 and lateral air-guiding elements 6 (FIG. 3) and in each case a foldable air scoop 7 arranged between the air-guiding elements 5 and 6 are provided behind the front-end part 1. The air scoop is kept together with the central air-guiding element 5 via connecting elements 8, 9 in a pre-installation position I (FIG. 4) and an installation position II (FIG. 3), and is kept with a snap fit on the lateral air-guiding element 6 via further connecting elements 10, 11 at a remote end 12 in the installation position II (FIG. 4). The air scoop 7 is provided with an air-guiding duct 13 which brings about a direct air supply to a charge air cooler 14 in the vehicle.

The air scoop 7 is arranged approximately in the region of a lateral boundary rib of the central air inlet opening 2, and the air duct 13 is aligned directly with the end surface of the charge air cooler 4.

Figure 5:
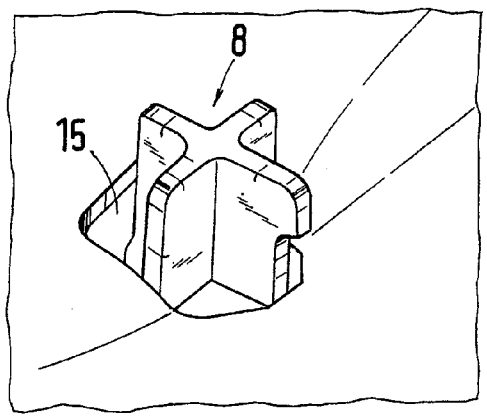
FIG. 5 is a diagrammatic, perspective view of an upper connecting element (hooked peg) of the air scoop to the central air-guiding element.
Figure 6:
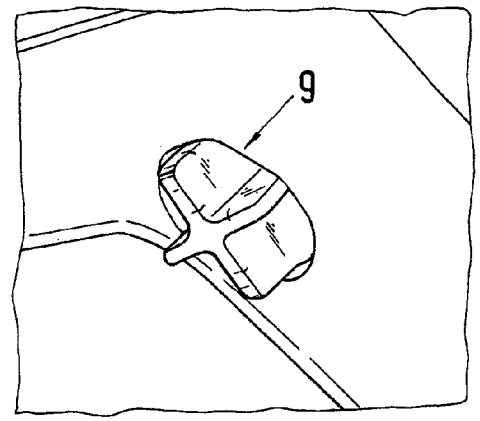
FIG. 6 is a diagrammatic, perspective view of a lower connecting element (hooked peg) of the air scoop to the central air-guiding element.

In order to be pivotable in relation to the central air-guiding element 5 in the installation position II and in the pre-installation position I, the air scoop 7 is provided with the connecting elements 8 and 9 which contain "hooked pegs" which engage in openings 15, 16, which correspond thereto, in limbs 5a, 5b of the air-guiding element 5 and are held therein. The hooked pegs 8, 9 are integrally formed on or injection molded onto outer limbs 19, 20 of the air scoop 7 and extend approximately vertically outward. The hooked pegs 8, 9 engage over the edges of the openings 15, 16 for fixing purposes (FIGS. 5 and 6).

Figure 7:
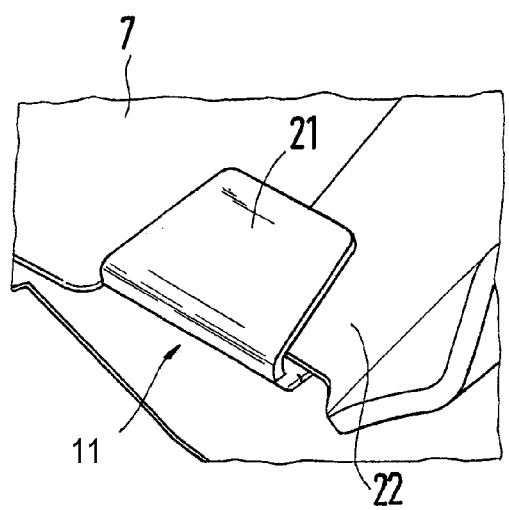
FIG. 7 is a diagrammatic, perspective view of an upper connecting element (pocket-shaped receptacle) of the air scoop to the lateral air-guiding element.
Figure 8:
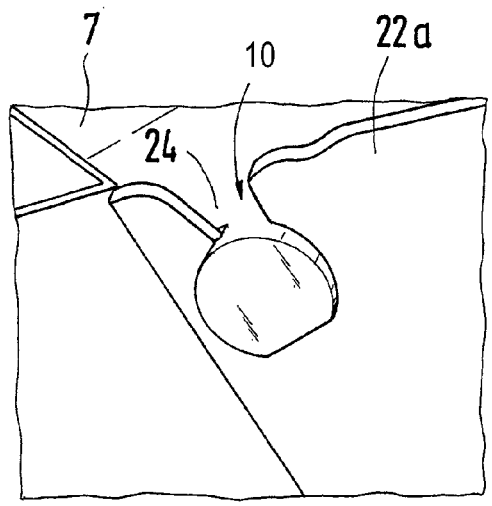
FIG. 8 is a diagrammatic, perspective view of a lower connecting element (head peg) of the air scoop to the lateral air-guiding element.

The air scoop 7 is connected to the lateral air-guiding element 6 in the installation position II via the connecting elements 10, 11. The upper connecting element 11 contains a pocket-shaped receptacle on an upper limb 19, which receptacle is formed by an angled tab 21 which engages over an upper limb 22 of the lateral air-guiding element 6 (FIG. 7). The other, lower connecting element 10 contains a "head peg" which snaps into a slot 24 in the lower limb 22a of the lateral air-guiding element 6 (FIG. 8).

In the delivery state, the air scoop 7 is folded through approximately 180° from the installation position II into the pre-installation position I according to FIG. 4. The air scoop 7 is held in a clamping manner between the limbs 5a, 5b of the central air-guiding element 5 in the pre-installation position I. After pivoting about the connecting elements 8, 9 into the installation position II, the connecting element 11 on the upper limb 22 and the connecting element 10 on the lower limb 22a snap into a slot 24 in the manner of clips. Installation and removal of the air scoop 7 is therefore possible in a simple manner.

The invention claimed is:

1. A front-end part of a motor vehicle, comprising:
 a central air-guiding element having a central air inlet opening formed therein and directed toward a radiator of an internal combustion engine;
 lateral air-guiding elements having lateral air inlet openings formed therein and directed toward a charge air cooler of the internal combustion engine; and
 air scoops each having an air-guiding duct, one of said air scoops disposed in each case between said central air inlet opening and one of said lateral air inlet openings, and, in a pre-installation position, said air scoops are kept folded away from said lateral air-guiding elements on said central air-guiding element and, in an installation position, said air scoops are folded back and can be connected to said lateral air-guiding elements.

2. The front-end part according to claim 1, wherein:
 said central air-guiding element has limbs with free ends; and
 said air scoops have connecting elements, and in the pre-installation position and the installation position, said air scoops are kept attached to said free ends of said limbs of said central air-guiding element via said connecting elements.

3. The front-end part according to claim 2, wherein said limbs of said central air-guiding element having corresponding openings formed therein;
 said air scoop has outer limbs with end sides; and
 said connecting elements are hooked pegs which are injection molded onto said end sides of said outer limbs of said air scoops and are disposed directed vertically outward and snap in a hooking manner into said corresponding openings in said limbs of said central air-guiding element.

4. The front-end part according to claim 3, wherein said air scoops can be pivoted via said hooked pegs inward in a direction of a longitudinal center plane of the vehicle in the pre-installation position and outward toward an outer side of the motor vehicle in the installation position.

5. The front-end part according to claim 2, wherein in the pre-installation position, said air scoops are kept folded away inward together with said central air-guiding element at least on an upper limb of said limbs of said central air-guiding element.

6. The front-end part according to claim 3, wherein:
 said air scoops each have an upper connecting element and a lower connecting element; and
 said lateral air-guiding elements have further limbs, and in the installation position, said air scoops can be connected with a snap fit to said further limbs of said lateral air-guiding elements via said upper connecting element and said lower connecting element.

7. The front-end part according to claim 6, wherein said outer limbs of said air scoops include an upper limb and a lower limb, said upper connecting element is disposed on said upper limb and has a pocket-shaped receptacle with a tab which, in the installation position, engages in a holding manner over an edge of said further limb of said lateral air-guiding elements.

8. The front-end part according to claim 7, wherein:
 said further limbs of said lateral air-guiding elements each have a slot formed therein; and
 said lower connecting element is disposed on said lower limb of said air scoops and has a head peg which, in the installation position, engages, to provide a snap fit, in said slot in one of said further limbs of said lateral air-guiding elements.

* * * * *

UNITED STATES PATENT AND TRADEMARK OFFICE
Certificate

Patent No. 7,644,979 B2                                    Patented: January 12, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Christoph Bauernfeind, Bietigheim-Bissingen (DE); and Ralf Hemmersmeier, Verl (DE).

Signed and Sealed this Twenty-sixth Day of July 2011.

D. Glenn Dayoan
*Supervisory Patent Examiner*
Art Unit 3612
Technology Center 3600